United States Patent
Jiang et al.

(10) Patent No.: US 9,621,924 B2
(45) Date of Patent: Apr. 11, 2017

(54) VEXTEX CORRECTION METHOD AND APPARATUS FOR ROTATED THREE-DIMENSIONAL (3D) COMPONENTS

(75) Inventors: Wenfei Jiang, Beijing (CN); Kangying Cai, Beijing (CN); Jiang Tian, Beijing (CN)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 14/390,546

(22) PCT Filed: Apr. 18, 2012

(86) PCT No.: PCT/CN2012/074286
§ 371 (c)(1),
(2), (4) Date: Oct. 3, 2014

(87) PCT Pub. No.: WO2013/155687
PCT Pub. Date: Oct. 24, 2013

(65) Prior Publication Data
US 2015/0055882 A1 Feb. 26, 2015

(51) Int. Cl.
*G06K 9/46* (2006.01)
*G06K 9/36* (2006.01)
(Continued)

(52) U.S. Cl.
CPC ............ *H04N 19/62* (2014.11); *G06T 9/001* (2013.01); *G06T 9/004* (2013.01); *H04N 19/124* (2014.11); *H04N 19/44* (2014.11); *H04N 19/91* (2014.11)

(58) Field of Classification Search
None
See application file for complete search history.

(56) References Cited

U.S. PATENT DOCUMENTS 5,905,502 A 5/1999 Deering
6,075,901 A 6/2000 Signes et al.
(Continued)

FOREIGN PATENT DOCUMENTS

CN 101511017 8/2009
CN 101666625 3/2010
(Continued)

OTHER PUBLICATIONS

Chen et al. "The Video Mesh: A Data Structure for Image-based Three-dimensional Video Editing", Computer Science and ArtificialIntelligence LaboratoryTechnical Report, Dec. 16, 2009.*
(Continued)

*Primary Examiner* — Randolph I Chu
(74) *Attorney, Agent, or Firm* — Brian J. Dorini; Xiaoan Lu

(57) ABSTRACT

A 3D model can be modeled using pattern-instance representation, wherein an instance component may be represented as transformation (for example, rotation, translation, and scaling) of a pattern. Quantization errors may be introduced when encoding rotation information, causing different vertex coordinate errors at different vertices of an instance. To efficiently compensate the vertex coordinate errors, an upper bound can be estimated for the vertex coordinate error of a vertex. Based on the upper bound, the codec decides whether the vertex coordinate error of the vertex needs to be compensated, and decides a quantization parameter for compensating the vertex coordinate error if compensation is needed. The upper bound can be estimated at both the encoder and decoder, and thus, no explicit signaling is needed to indicate whether vertex coordinate error compensation is used or to indicate the quantization parameter for the vertex coordinate error.

17 Claims, 10 Drawing Sheets

(51) Int. Cl.
*H04N 19/62* (2014.01)
*G06T 9/00* (2006.01)
*H04N 19/124* (2014.01)
*H04N 19/44* (2014.01)
*H04N 19/91* (2014.01)

(56) References Cited

U.S. PATENT DOCUMENTS

| | | | |
|---|---|---|---|
| 6,204,854 | B1 | 3/2001 | Signes et al. |
| 6,891,535 | B2 | 5/2005 | Perry et al. |
| 6,947,045 | B1 | 9/2005 | Ostermann et al. |
| 7,289,868 | B2 | 10/2007 | Picciotto et al. |
| 8,310,480 | B2 | 11/2012 | Kim et al. |
| 2008/0031325 | A1* | 2/2008 | Qi .................. H04N 19/176 375/240.09 |
| 2009/0184956 | A1 | 7/2009 | Kim et al. |
| 2011/0285708 | A1 | 11/2011 | Chen et al. |
| 2012/0075302 | A1 | 3/2012 | Cai et al. |
| 2013/0106834 | A1* | 5/2013 | Curington .............. G06T 9/00 345/419 |

FOREIGN PATENT DOCUMENTS

| | | |
|---|---|---|
| CN | 102308318 A | 1/2012 |
| CN | 102509339 | 6/2012 |
| JP | 2000011206 | 1/2000 |
| JP | 2001231037 | 8/2001 |
| JP | 2002532923 | 10/2002 |
| JP | 2004102834 | 4/2004 |
| JP | 2005332412 | 12/2005 |
| JP | 2006277772 | 10/2006 |
| KR | 2001008944 | 2/2001 |
| WO | WO9858350 | 12/1998 |
| WO | WO0103071 | 1/2001 |
| WO | WO2010149492 | 12/2010 |
| WO | WO2011044713 | 4/2011 |
| WO | WO2012000132 | 1/2012 |
| WO | WO2012040883 | 4/2012 |
| WO | WO2013113170 | 8/2013 |

OTHER PUBLICATIONS

Sorkine et al.: "High-pass quantization for mesh encoding", Symposium on Geometry Processing: Aachen, Germany, Jun. 23, 2003, pp. 42-51.

Anonymous: "WD for Pattern based 3D mesh compression",102 MPEG Meeting; Oct. 15, 2012-Oct. 19, 2012; Shanghai; (Motion Picture Expert Group or ISO/IEC JTC1/SC29/WG11)?n° N13178,Oct. 22, 2012, 32 pages.

Cai Kangying et al: "PB3DMC error compensation",102 MPEG Meeting; Oct. 15, 2012-Oct. 19, 2012; Shanghai; (Motion Picture Expert Group or ISA-IEC JTC1/SC29/WG11),n° m26702, Oct. 9, 2012, 4 pages.

Lei Zhang et al: "Cascaded quantization based progressive 3D mesh compression",3DTV Conference: The Truth Vision—Capture, Transmission ANS Display of 3D Video (3DTV-CON), 2011, IEEE,May 16, 2011, pp. 1-4.

Seungwook Lee et al: "A Proposal on quantization of 3D mesh coding",85 MPEG Meeting; Jul. 21, 2008-Jul. 25, 2008; Hannover; 5Motion Picture Expert Group or ISO/IEC JTC1/SC29/WG11),n° M15669,Jul. 17, 2008, 4 pages.

Mary-Luc Champel: "PB3DMC bitstream update (error compensation)",103 MPEG Meeting; Jan. 21, 2013-Jan. 25, 2013; Geneva; (Motion Picture Expert Group or ISO/IEC JTC1/SC29/WG11),n° m28147,Jan. 21, 2013, 34 pages.

* cited by examiner

VEXTEX CORRECTION METHOD AND APPARATUS FOR ROTATED THREE-DIMENSIONAL (3D) COMPONENTS

TECHNICAL FIELD

This application claims the benefit, under 35 U.S.C. §365 of International Application PCT/US2012/074286, filed 18 Apr. 2012, which was published in accordance with PCT Article 21(2) on 24 Oct. 2013 in English.

BACKGROUND

In practical applications, many 3D models consist of a large number of connected components. These multi-component 3D models usually contain many repetitive structures in various transformations, as shown in FIG. 1.

We have provided an efficient compression algorithm for multi-component 3D models (PB3DMC), by taking advantage of repetitive structures in input models. Repetitive structures of a 3D model are discovered in various positions, orientations, and scaling factors. The 3D model is then organized into "pattern-instance" representation. A pattern is used to denote a representative geometry of a corresponding repetitive structure. Connected components belonging to a repetitive structure are denoted as instances of the corresponding pattern and may be represented by a pattern ID and transformation information, for example, reflection, translation, rotation and possible scaling with respect to the pattern. The instance transformation information may be organized into, for example, reflection part, translation part, rotation part, and possible scaling part. There might be some components of the 3D models that are not repetitive, which are referred to as unique components.

In a commonly owned PCT application, entitled "Bitstream syntax and semantics of repetitive structure discovery based 3D model compression algorithm" by K. Cai, W. Jiang, and J. Tian (PCT/CN2011/076991), the teachings of which are specifically incorporated herein by reference, two modes for compressing instance transformation information are disclosed.

In another commonly owned PCT application, entitled "System and method for error controllable repetitive structure discovery based compression" by K. Cai, W. Jiang, and T. Luo (PCT/CN2012/070877), the teachings of which are specifically incorporated herein by reference, a method and apparatus for identifying repetitive structures in 3D models to reduce redundancy among instance components, and thus to improve compression efficiency, are disclosed.

SUMMARY

The present principles provide a method for generating or decoding a bitstream representing a 3D model, comprising the steps of: accessing a reconstructed instance corresponding to an instance of a pattern, the pattern being associated with a structure of the 3D model and the instance being represented as a transformation of the pattern; accessing a first quantization parameter used for quantizing a rotation part of the transformation, wherein the reconstructed instance is determined in response to the first quantization parameter; and performing encoding or decoding of a vertex coordinate error between a vertex of the instance and a corresponding vertex of the reconstructed instance in response to at least one of the first quantization parameter and a distance between the corresponding vertex of the reconstructed instance and a rotation center of the reconstructed instance as described below. The present principles also provide an apparatus for performing these steps.

The present principles also provide a method for generating or decoding a bitstream representing a 3D model, comprising the steps of: accessing a reconstructed instance corresponding to an instance of a pattern, the pattern being associated with a structure of the 3D model and the instance being represented as a transformation of the pattern; accessing a first quantization parameter used for quantizing a rotation part of the transformation, wherein the reconstructed instance is determined in response to the first quantization parameter; estimating an upper bound of a vertex coordinate error between a vertex of the instance and a corresponding vertex of the reconstructed instance in response to at least one of the first quantization parameter and a distance between the corresponding vertex of the reconstructed instance and the rotation center of the reconstructed instance; and performing encoding or decoding of the vertex coordinate error in response to the upper bound of the vertex coordinate error as described below. The present principles also provide an apparatus for performing these steps.

The present principles also provide a computer readable storage medium having stored thereon instructions for generating or decoding a bitstream according to the methods described above.

The present principles also provide a computer readable storage medium having stored thereon a bitstream generated according to the methods described above.

DETAILED DESCRIPTION

Figure 1:
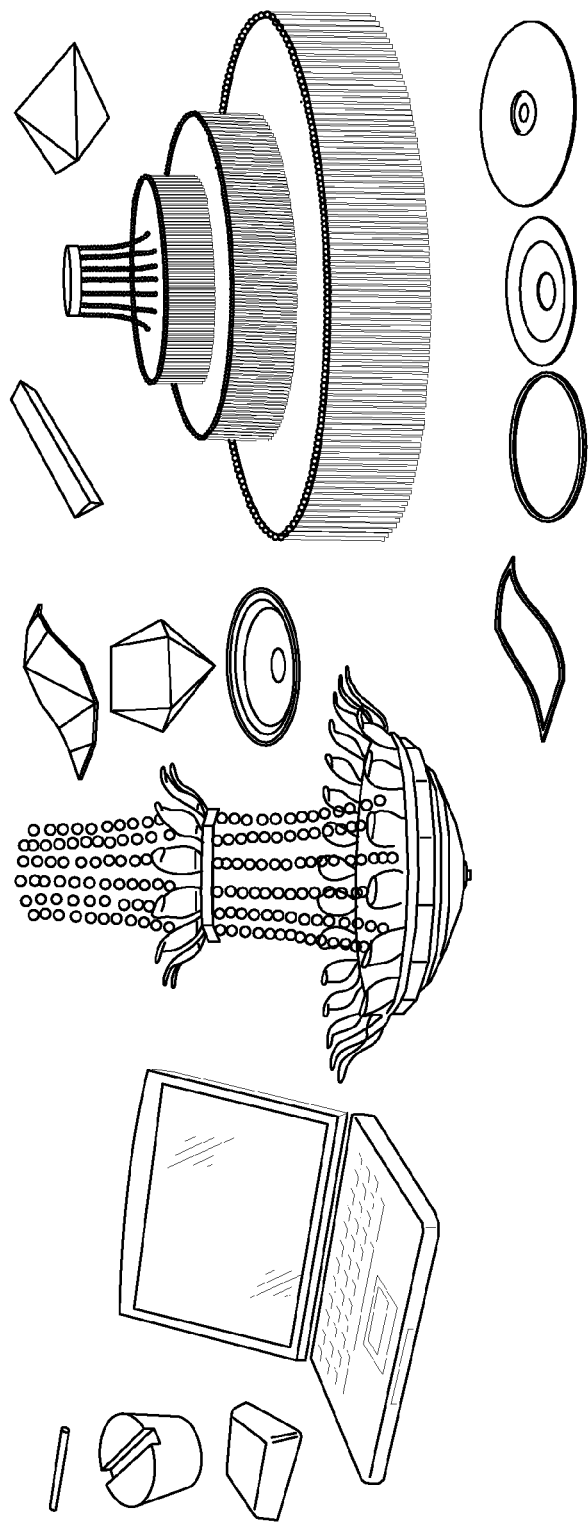
FIG. 1 shows exemplary 3D models with a large number of connected components and repetitive structures.

As shown in FIG. 1, there may be many repetitive structures in 3D models. To efficiently encode the 3D models, the repetitive structures may be organized into patterns and instances, wherein an instance can be represented as a transformation of a corresponding pattern, for example, using a pattern ID and a transformation matrix which contains information such as translation, rotation, and scaling.

When an instance is represented by a pattern ID and a transformation matrix, the pattern ID and the transformation matrix are to be compressed when compressing the instance. Consequently, an instance may be reconstructed through the pattern ID and the decoded transformation matrix, that is, an instance may be reconstructed as transformation (from the decoded transformation matrix) of a decoded pattern indexed by the pattern ID. In one embodiment, when encoding the transformation matrix, the rotation part of the transformation matrix may be quantized, for example, using a constant number of bits. Because of loss introduced at quantization, the decoded rotation part may be different from the original rotation part.

Figure 2A:
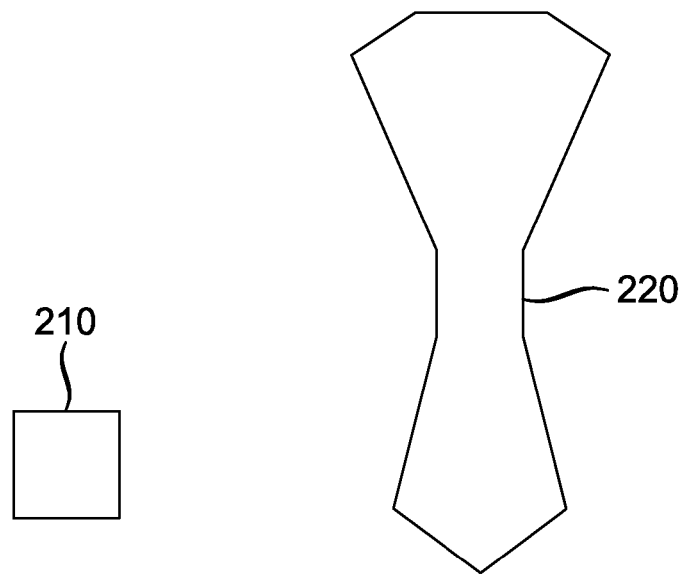
FIG. 2A shows pictorial examples depicting patterns and FIG. 2B shows pictorial examples depicting corresponding instances and reconstructed instances.
Figure 2B:
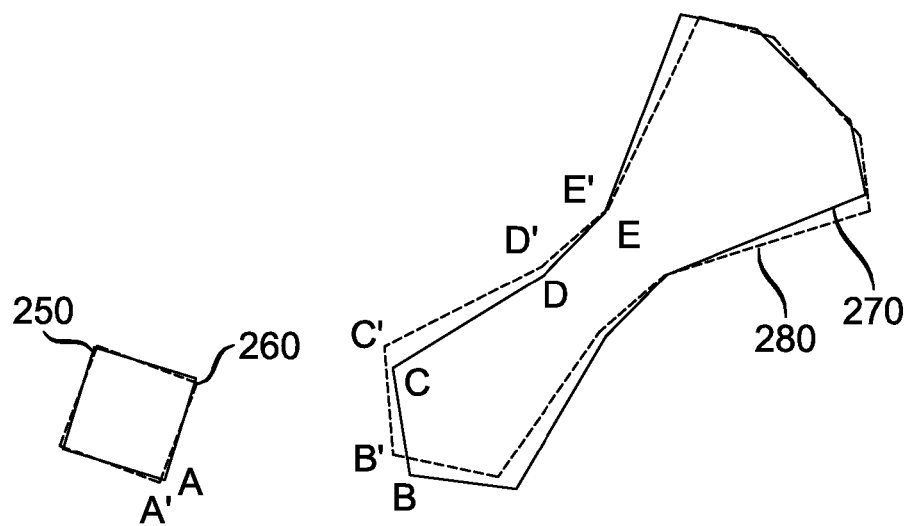

FIGS. 2A and 2B illustrate exemplary components in a 2D representation, wherein components 210 and 220 are patterns, components 250 and 270 (in solid lines) are original instances to be compressed, and components 260 and 280 (in dashed lines) are reconstructed instances. In particular, instances 250 and 270 can be represented as transformed (i.e., rotated and translated) versions of patterns 210 and 220, respectively.

In the examples of FIG. 2B, quantization of rotation introduces an error of about 5°, thus causing differences between original instances and reconstructed instances. As can be seen in FIG. 2B, while the rotation errors (in angular measure) are similar for instances 250 and 270, the vertex coordinate errors (i.e., vertex shifts, for example, from A to A', B to B' in FIG. 2B, between original instances and reconstructed instances) caused by rotation quantization vary significantly between both instances, with instance 270 having much larger vertex coordinate errors. Consequently, the quality of reconstructed components may be inconsistent, for example, a larger instance may have lower reconstruction quality than a smaller instance.

The present principles provide a method and apparatus for efficiently compensating the vertex coordinate errors caused by rotation quantization. In one embodiment, the rotation information may be quantized adaptively according to the size of an instance. For example, a finer quantization parameter, such as a larger number of bits or a smaller quantization step size, may be used for quantizing the rotation part of a larger instance.

Since different vertices in a component have different vertex coordinate errors caused by the same rotation error, using a finer quantization parameter alone may not always be a good solution. Using instance 270 as an example, vertices B and C have larger vertex coordinate errors which may need to be encoded, while vertices D and E are closely reconstructed and their vertex coordinate errors may not need to be encoded. In order to have a quantization parameter fine enough for precise reconstruction of vertices B and C, vertices D and E are likely to be reconstructed at a precision higher than necessary, that is, certain bits are spent unnecessarily on vertices D and E.

In another embodiment, recognizing that vertices in a 3D component may have different vertex coordinate errors, the present principles compensate the vertex coordinate errors adaptively. It is observed that the farther a vertex is from the rotation center of an instance, the larger the vertex coordinate error could be. That is, whether a vertex coordinate error needs to be encoded may depend on the distance between the vertex and the rotation center. Consequently, the decision on whether a vertex coordinate error needs to be compensated may vary from vertex to vertex.

Figure 3:
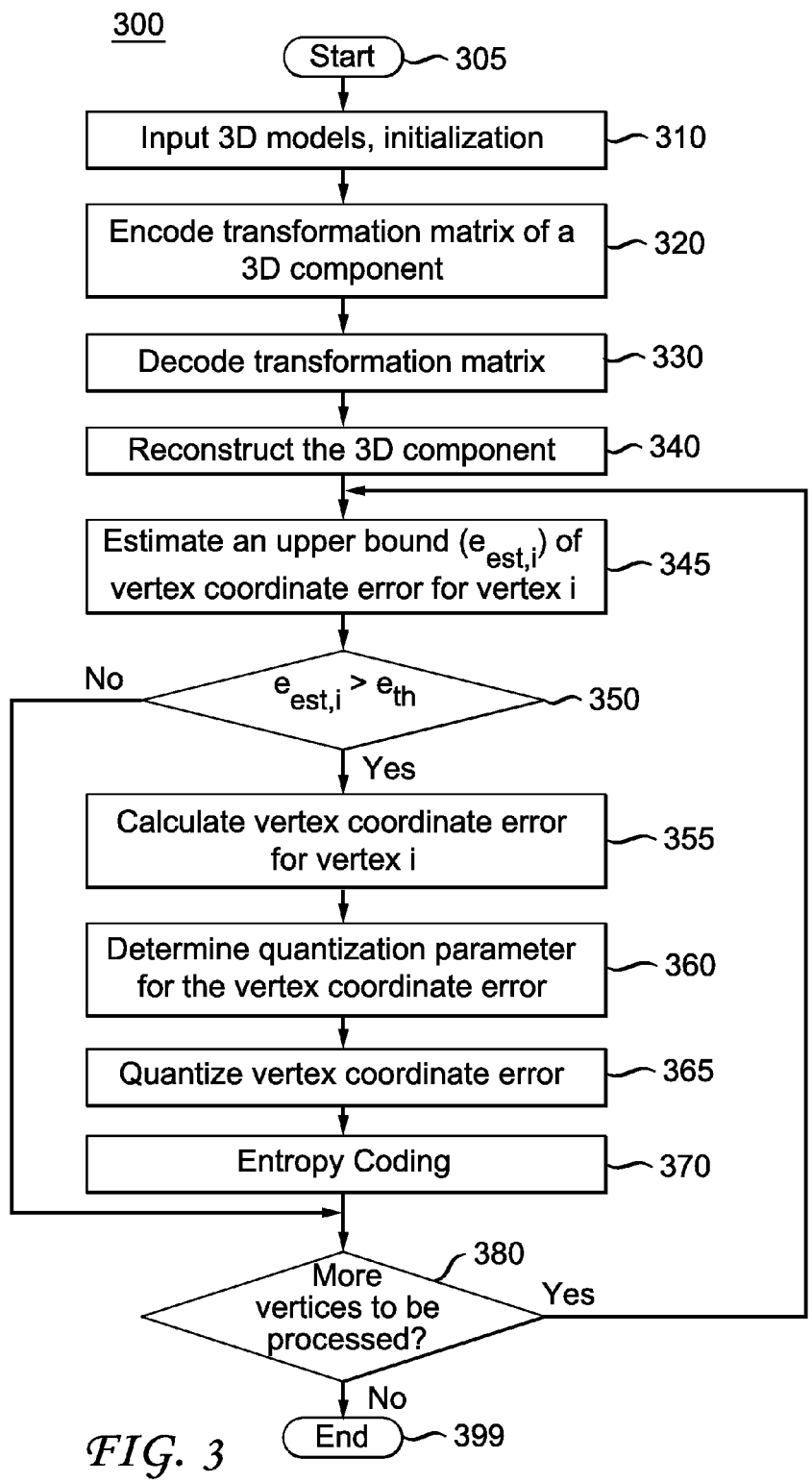
FIG. 3 is a flow diagram depicting an example for encoding an instance of a 3D model, in accordance with an embodiment of the present principles.

FIG. 3 illustrates an exemplary method 300 for encoding an instance of a 3D model. Method 300 starts at step 305. At step 310, 3D model data is input and initialization is performed. Additional data, such as quality parameter, maximum tolerable vertex coordinate error, quantization parameters for translation part and rotation part of a transformation matrix, may also be input or inferred from the input. In one exemplary embodiment, the initialization step may organize the repetitive structures into patterns and instances, generate transformation matrices for instances, and encode patterns to form reconstructed patterns. For a particular to-be-encoded instance (denoted as C), the corresponding original pattern, reconstructed pattern, and transformation matrix are denoted as P, P', and T, respectively. It is possible that an instance can be precisely represented as a transformation of a pattern, that is, C=TP. Alternatively, the transformation of the pattern may be an approximate of the instance under some circumstances, that is, C≈TP.

The transformation matrix (T) is encoded at step 320. The encoded transformation matrix is then decoded as T' at step 330. The instance is reconstructed at step 340, for example, using a corresponding reconstructed pattern and decoded transformation matrix (C'=T'P'). With the reconstructed instance, method 300 proceeds to examine whether an individual vertex of the instance may have a large vertex coordinate error that needs to be encoded.

At step 345, an upper bound of the vertex coordinate error of a vertex i, denoted as $e_{est,i}$, is estimated. By using the upper bound of the vertex coordinate error rather than the actual vertex coordinate error, the present principles enable both the encoder and decoder to make the same decision on whether a vertex needs to compensate the vertex coordinate error.

At step 350, it checks whether $e_{est,i}$ exceeds a threshold, for example, the maximum tolerable error received from the input or a threshold estimated from input parameters. If $e_{est,i}$ exceeds the threshold, the actual vertex coordinate error ($E_i$) between the vertex ($V_i'$) in the reconstructed instance and the corresponding vertex ($V_i$) in the original instance is calculated at step 355, for example, as $E_i=V_i-V_i'$. In order to encode the vertex coordinate error, a quantization parameter is estimated at step 360. The vertex coordinate error is quantized at step 365 and then entropy coded at step 370. Otherwise, if $e_{est,i}$ does not exceed the threshold, the vertex coordinate error is not encoded and the control is passed to step 380.

It checks whether more vertices need to be processed at step 380. If more vertices are to be processed, the control is returned to step 345. Otherwise, the control is passed to the end step 399.

The steps in method 300 may be adjusted. In one embodiment, step 360 may be implemented before step 355. In another embodiment, at step 345, the upper bounds of vertex coordinate errors are estimated for all vertices to be processed, and a maximum value of the upper bounds $e_{est,max}=\max(e_{est,1}, \ldots, e_{est,i}, \ldots)$ is calculated, wherein $e_{est,i}$ denotes an estimated upper bound for vertex i in the instance. If $e_{est,max}<e_{th}$, all vertex coordinate errors under consideration are smaller than the threshold, and no vertex error needs to be encoded. Thus, steps 350-380 may be skipped. Otherwise, if $e_{est,max}\geq e_{th}$, some vertices may have an vertex coordinate error exceeding the threshold and steps 350-380 may be executed. Steps 355-370 may be referred to as steps for vertex correction or vertex error compensation.

Figure 4:
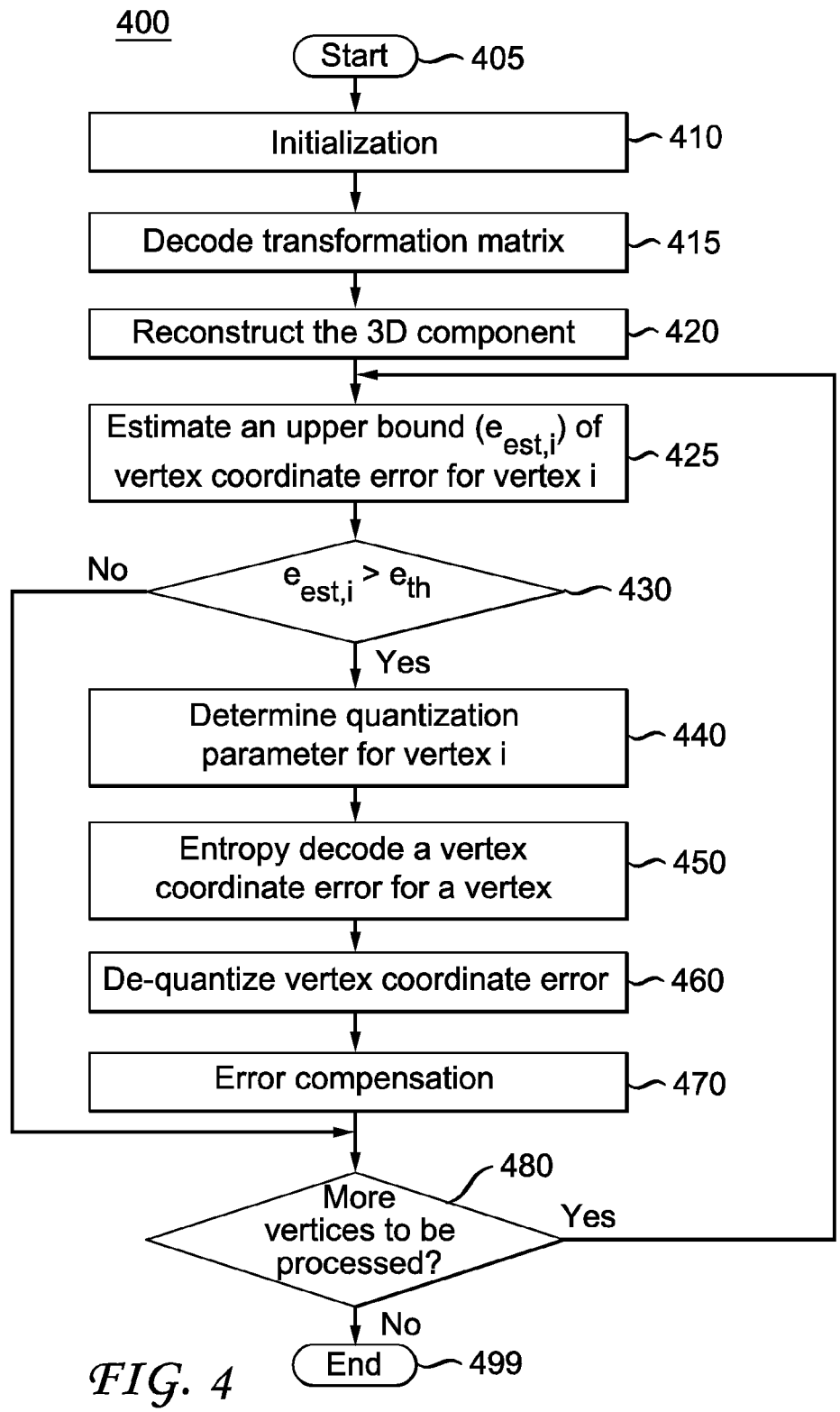
FIG. 4 is a flow diagram depicting an example for decoding an instance of a 3D model, in accordance with an embodiment of the present principles.

FIG. 4 illustrates an exemplary method 400 for decoding an instance of a 3D model. The input of method 400 may include a bitstream, for example, the bitstream generated using method 300. Additional data, for example, a reconstructed pattern (P') corresponding to the instance to be decoded may also be included as an input. Method 400 starts at step 405. At step 410, initialization is performed, for example, the quantization parameters for the transformation matrix are derived from the input bitstream.

The transformation matrix is decoded as T' at step 415. The instance is reconstructed as C' at step 420, for example, using a corresponding reconstructed pattern and decoded transformation matrix (C'=T'P'). At step 425, an upper bound ($e_{est,i}$) of the vertex coordinate error of vertex i is estimated.

At step 430, it checks whether $e_{est,i}$ exceeds a threshold. If $e_{est,i}$ exceeds the threshold, a quantization parameter, for example, the number of quantization bits ($n_q$), is estimated at step 440. The encoded vertex coordinate error is decoded at step 450, for example, $n_q$ bits are decoded from the bitstream. The vertex coordinate error is then de-quantized to $E_i'$ at step 460. At step 470, the de-quantized vertex coordinate error ($E_i'$) is used to compensate the corresponding vertex ($V_i'$) of the instance initially reconstructed at step 420, for example, as $V_i''=V_i'+E_i'$. That is, the vertex of the reconstructed instance is refined.

Otherwise, if $e_{est,i}$ does not exceed the threshold, the vertex coordinate error is not encoded and the control is passed to step 480. It checks at step 480 whether more vertices need to be processed. If yes, the control is returned to step 425. Otherwise, the control is passed to the end step 499.

Note that to properly decode the instance, the same methods of estimating the upper bound of vertex coordinate error ($e_{est,i}$) and estimating the quantization parameter, the same value of threshold, should be used at the encoder and decoder. For example, when the bitstream generated by method 300 is used as an input to method 400, steps 425 and 440 should correspond to steps 345 and 360 respectively, and the values of the threshold ($e_{th}$) used at steps 430 and 350 should be the same.

In the following, exemplary embodiments of estimating (345, 425) an upper bound of the vertex coordinate error for a vertex and of determining (360, 440) a quantization parameter for the vertex are discussed.
Estimate an Upper Bound of Vertex Coordinate Error The rotation from a pattern to an instance may be represented by three angles {$\psi$, $\theta$, $\phi$}, for example, $$\theta \in \left[-\frac{1}{2}\pi, \frac{1}{2}\pi\right], \psi, \Phi \in [-\pi, \pi].$$

In one example, $\psi$, $\theta$ and $\phi$ are quantized with n, n−1 and n bits, respectively, such that the rotation angles have the same range of quantization errors, that is, $\Delta\psi$, $\Delta\theta$ and $\Delta\phi$ all fall in $$\left[-\frac{\pi}{2^n}, \frac{\pi}{2^n}\right],$$

wherein $\Delta\psi$, $\Delta\theta$ and $\Delta\phi$ are quantization errors for $\psi$, $\theta$ and $\phi$, respectively. The angles may be in different ranges and use other amount of quantization bits. Using geometric property, an upper bound of the vertex coordinate error may be derived.

Figure 5:
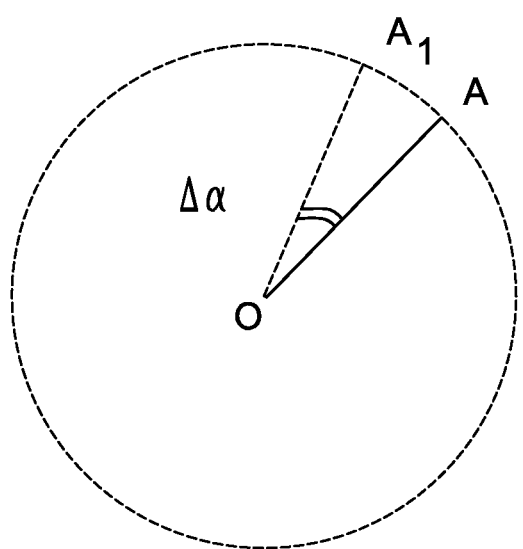
FIG. 5 is a pictorial example depicting a vertex coordinate error caused by quantization of the rotation part, in accordance with an embodiment of the present principles.

Rotating a component can be considered as moving each of its vertices on a sphere whose radius is the distance between the vertex and the rotation center of the component. FIG. 5 shows a 2D pictorial example depicting how a vertex may be reconstructed at a different location. In this example, point O is the rotation center of the component, point A is a vertex of the component, and vertex A is reconstructed at position $A_1$ due to a quantization error $\Delta\alpha$. It can be inferred that the linear distance between A and $A_1$, $|AA_1|$, is smaller than the spherical distance between A and $A_1$, $A\hat{A}_1$, that is $|AA_1|<A\hat{A}_1=\Delta\alpha r$.

Suppose the rotation center is the origin, given the coordinates of vertex A are (x, y, z), the vertex shift ($|AA_1|$) caused by rotation quantization can be calculated as follows:

$$|AA_1| < \sqrt{\left(\Delta\psi\sqrt{x^2+y^2}\right)^2 + \left(\Delta\theta\sqrt{y^2+z^2}\right)^2 + \left(\Delta\phi\sqrt{x^2+z^2}\right)^2} \leq \qquad (1)$$

$$\sqrt{\left(\frac{\pi}{2^n}\sqrt{x^2+y^2}\right)^2 + \left(\frac{\pi}{2^n}\sqrt{y^2+z^2}\right)^2 + \left(\frac{\pi}{2^n}\sqrt{x^2+z^2}\right)^2} =$$

$$\frac{\sqrt{2}\pi}{2^n}\sqrt{x^2+y^2+z^2} = \frac{\sqrt{2}\pi}{2^n}r.$$

That is, the upper bound of the vertex coordinate error of vertex i caused by the rotation quantization can be estimated as:

$$e_{est,i} = \frac{\sqrt{2}\pi}{2^n}r_i, \qquad (2)$$

$$e_{est,max} = \max(e_{est,1}, \ldots, e_{est,i}, \ldots) = \frac{\sqrt{2}\pi}{2^n}r_{max},$$

wherein $r_i$ is the distance between vertex i and the rotation center of the reconstructed instance, and $r_{max}$ is the farthest distance between vertices and the rotation center of the reconstructed instance. The upper bound can also be derived when other quantization parameters are used for the rotation angles. Other geometrical or mathematical properties may be further utilized to derive a tighter upper bound.

By determining whether a vertex coordinate error caused by rotation quantization needs to be encoded or decoded based on information that is available at both the encoder and decoder, no explicit signaling bits in the bitstream are needed to indicate whether a vertex coordinate error is encoded, and thus, may improve compression efficiency.
Determine a Quantization Parameter for a Vertex Coordinate Error Given the estimated upper bound ($e_{est,i}$) of the vertex coordinate error for vertex i, the quantization parameter can be derived. In one embodiment, the quantization parameter can be chosen such that the quantization step size for the vertex coordinate error is similar to that for the translation part. When the number of quantization bits ($Q_{res,i}$) is to be estimated as the quantization parameter, $Q_{res,i}$ may be calculated as follows:

$$Q_{res,i} = \left\lceil Q_{translation} - \log_2\frac{\text{Range}}{e_{est,i}} \right\rceil, \qquad (3)$$

wherein $Q_{translation}$ is the number of quantization bits for the translation part of the transformation matrix, and Range is the dynamic range of the translation. When $$Q_{translation} - \log_2 \frac{\text{Range}}{e_{est,i}} < 1, Q_{res,i}$$

may be set to 0 and the vertex coordinate error for vertex i is not encoded.

$Q_{res,i}$ may be calculated differently than Eq. (3), for example, $$Q_{res,i} = \left\lfloor Q_{translation} - \log_2 \frac{\text{Range}}{e_{est,i}} \right\rfloor, \quad (4)$$

or $$Q_{res,i} = \text{round}\left(Q_{translation} - \log_2 \frac{\text{Range}}{e_{est,i}}\right).$$

If $Q_{res,i}=0$, the vertex coordinate error for vertex i is not encoded.

In Eqs. (3) and (4), the quantization parameter $Q_{res,i}$ is chosen such that the quantization step size for the vertex coordinate error is similar to that for the translation part of the transformation matrix. In other examples, the quantization parameter $Q_{res,i}$ may be chosen such that the quantization step size for the vertex coordinate error is similar to that for quantizing the pattern geometry.

In another embodiment, the quantization parameter may be chosen such that the quantization step size is similar to the maximum tolerable error or the threshold ($e_{th}$). That is, the number of quantization bits may be calculated as:

$$Q_{res,i} = \left\lceil \log_2 \frac{e_{est,i}}{e_{th}} \right\rceil. \quad (5)$$

$Q_{res,i}$ may also be calculated differently than Eqs. (3)-(5). For example, $Q_{res,i}$ may be offset or scaled by a constant from the values calculated in Eqs. (3)-(5).

Suppose vertex i is located at $V_i=\{x_i, y_i, z_i\}$ and reconstructed vertex i is located at $V_i'=\{x_i', y_i', z_i'\}$, the vertex coordinate error can be calculated as:

$$E_i = V_i - V_i' = \{E_{x,i}, E_{y,i}, E_{z,i}\} = \{x_i - x_i', y_i - y_i', z_i - z_i'\}. \quad (6)$$

Using $E_{x,i}$ as an example, we explain how quantization or de-quantization may be performed.

Given the range of errors $[-e_{est,i}, e_{est,i}]$, the quantization step size may be calculated as:

$$q_{step} = \frac{2 \times e_{est,i}}{2^{Q_{res,i}}}.$$

Using the quantization step size, the vertex coordinate error $E_{x,i}$ may be quantized into a quantized error as:

$$e_q = \left\lfloor \frac{E_{x,i}}{q_{step}} \right\rfloor.$$

At the decoder, the quantized error $e_q$ may be de-quantized into a de-quantized error $E_{x,i}'$ as:

$$E_{x,i}' = (e_q + 0.5) q_{step}.$$

Similarly, the vertex coordinate error along other axes can be quantized or de-quantized. In the above, a uniform quantization scheme is used. Other quantization schemes may also be used for quantization or de-quantization.

In another embodiment, we take into account that the vertex coordinate errors along different axes (i.e., $E_{x,i}$, $E_{y,i}$, $E_{z,i}$) may be different and they may be quantized differently. For example, $|\Delta A_1|$ in Eq. (1) can be projected to three axes and the upper bound of the coordinate error along each axis can be calculated accordingly, and thus the quantization parameter for the coordinate error along each axis may be different. For example, the upper bound for the coordinate error can be determined for each individual axis as follows:

$$e\_x_{est,i} = e_{est,i} \sqrt{1 - \frac{x_i^2}{r_i^2}},$$

$$e\_y_{est,i} = e_{est,i} \sqrt{1 - \frac{y_i^2}{r_i^2}},$$

$$e\_z_{est,i} = e_{est,i} \sqrt{1 - \frac{z_i^2}{r_i^2}}.$$

Thus, the quantization bits can be determined for each axis respectively. By determining the quantization parameter, for example, the quantization step size or the number of quantization bits, based on information that is available to both the encoder and decoder, no explicit information about the quantization parameter for the vertex coordinate error is needed in the bitstream, and thus, may further improve compression efficiency.

Figure 6:
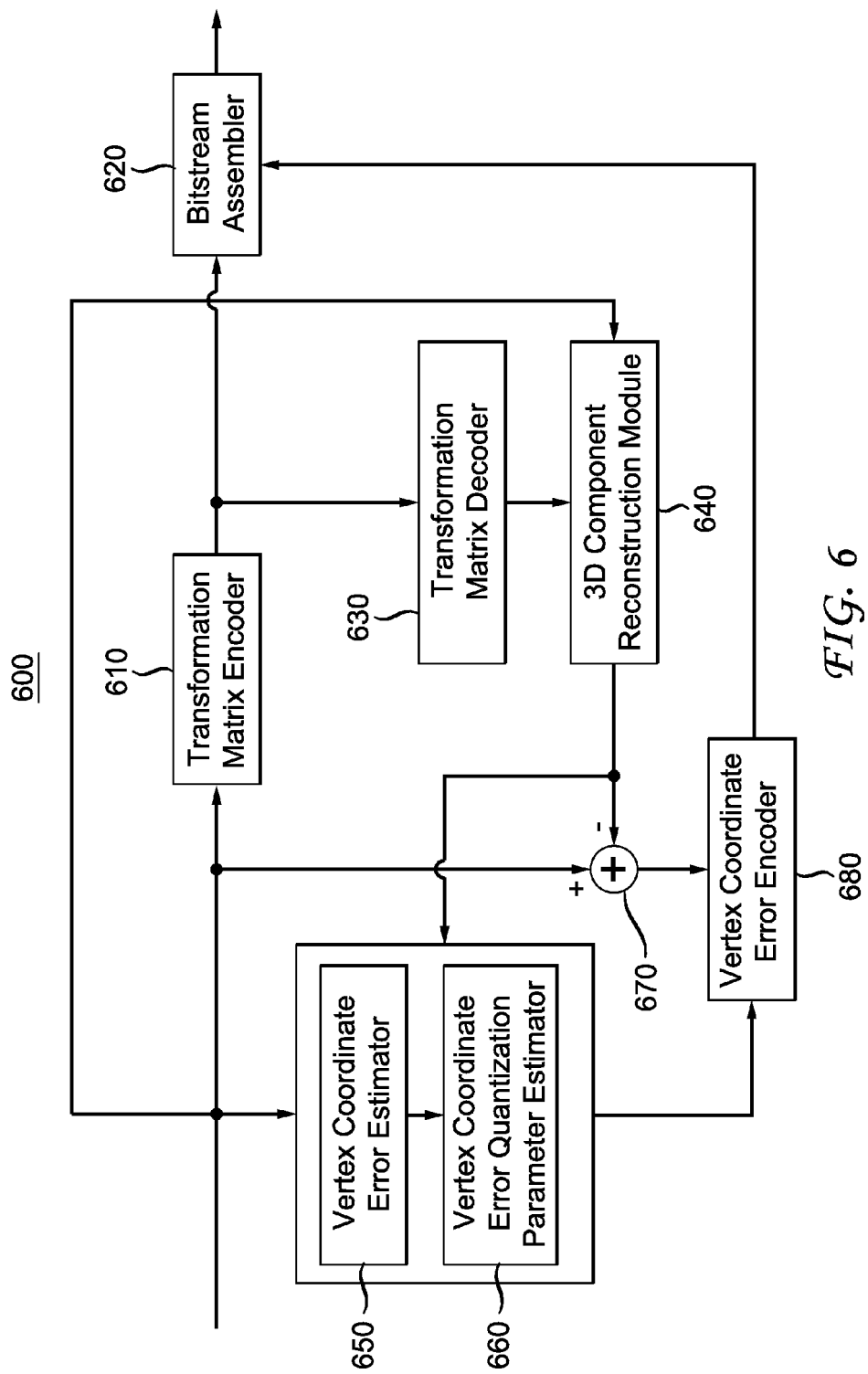
FIG. 6 shows an exemplary instance encoder according to the present principles.

FIG. 6 depicts a block diagram of an exemplary instance encoder 600. The input of apparatus 600 may include an instance (C) to be encoded, a corresponding pattern (P) and reconstructed pattern (P'), transformation matrix T, quality parameter, and quantization parameters for transformation matrix.

Transformation matrix encoder 610 encodes the transformation matrix T, for example, based on the quantization parameters for different parts of the transformation matrix. Transformation matrix decoder 630 decodes the output of encoder 610 to get a reconstructed transformation matrix T'. Using a corresponding reconstructed pattern P' and T', the instance may be reconstructed as C'=T'P' at 3D component reconstruction module 640. Adder 670 takes differences between the original instance and the reconstructed instance, for example, as E=C−C'.

Based on the reconstructed instance and the input quantization parameters for the transformation matrix, vertex coordinate error estimator 650 estimates an upper bound ($e_{est}$) of a vertex coordinate error, for example, using Eq. (2). If the upper bound ($e_{est}$) exceeds a threshold, vertex coordinate error quantization parameter estimator 660 estimates a quantization parameter for quantizing the vertex coordinate error at vertex coordinate error encoder 680. The outputs of transformation matrix encoder 610 and vertex coordinate error encoder 680 are assembled by bitstream assembler 620 into a bitstream, which can be combined with other bitstreams representing the pattern or other components to form an overall bitstream for a 3D model.

Figure 7:
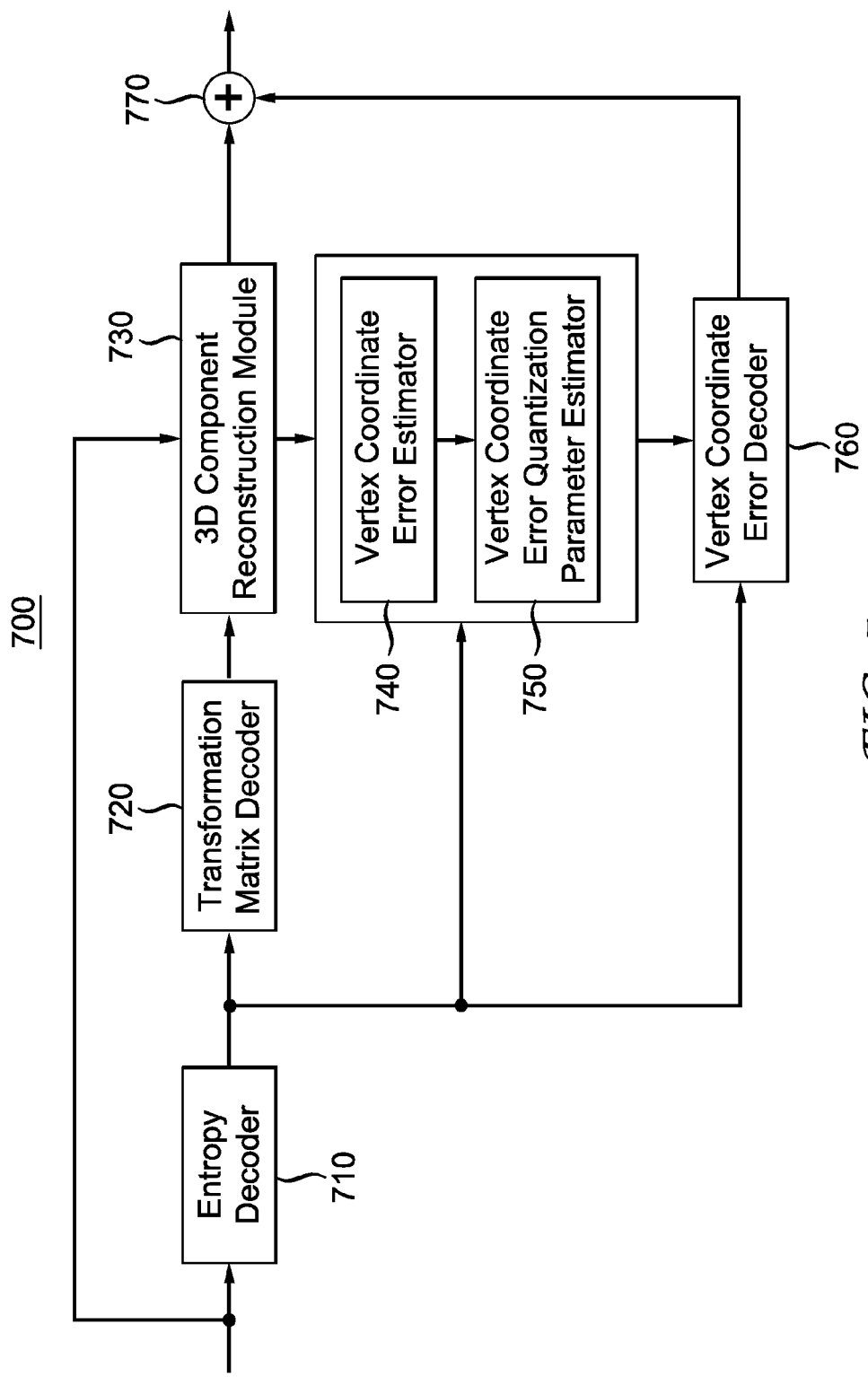
FIG. 7 shows an exemplary instance decoder according to the present principles.

FIG. 7 depicts a block diagram of an exemplary instance decoder 700. The input of apparatus 700 may include a bitstream corresponding to an instance (C), for example, a bitstream generated according to method 300 or by encoder 600, and a corresponding reconstructed pattern (P'). Entropy decoder 710 entropy decodes the bitstream, for example, to get quantized vertex coordinate errors and quantization parameters used for transformation matrix.

Transformation matrix decoder 720 reconstructs the transformation matrix T', for example, based on the quantization parameters for different parts of the transformation matrix. Using a corresponding reconstructed pattern P' and T', the instance may be reconstructed as C'=T'P' at 3D component reconstruction module 730.

Based on the reconstructed instance and the quantization parameters for the transformation matrix, vertex coordinate error estimator 740 estimates an upper bound ($e_{est}$) of a vertex coordinate error, for example, using Eq. (2). If the upper bound ($e_{est}$) exceeds a threshold, vertex coordinate error quantization parameter estimator 750 estimates a quantization parameter to be used for decoding the vertex coordinate error at vertex coordinate error decoder 760. The decoded vertex coordinate errors E' are used to refine the instance initially reconstructed at 3D component reconstruction module 730. In particular, adder 770 sums up the decoded coordinate errors (E') and the initial reconstructed instance (C'), for example, as C"=C'+E'. C" usually provides a more accurate representation of the original instance than the initial reconstructed instance C'.

Figure 8:
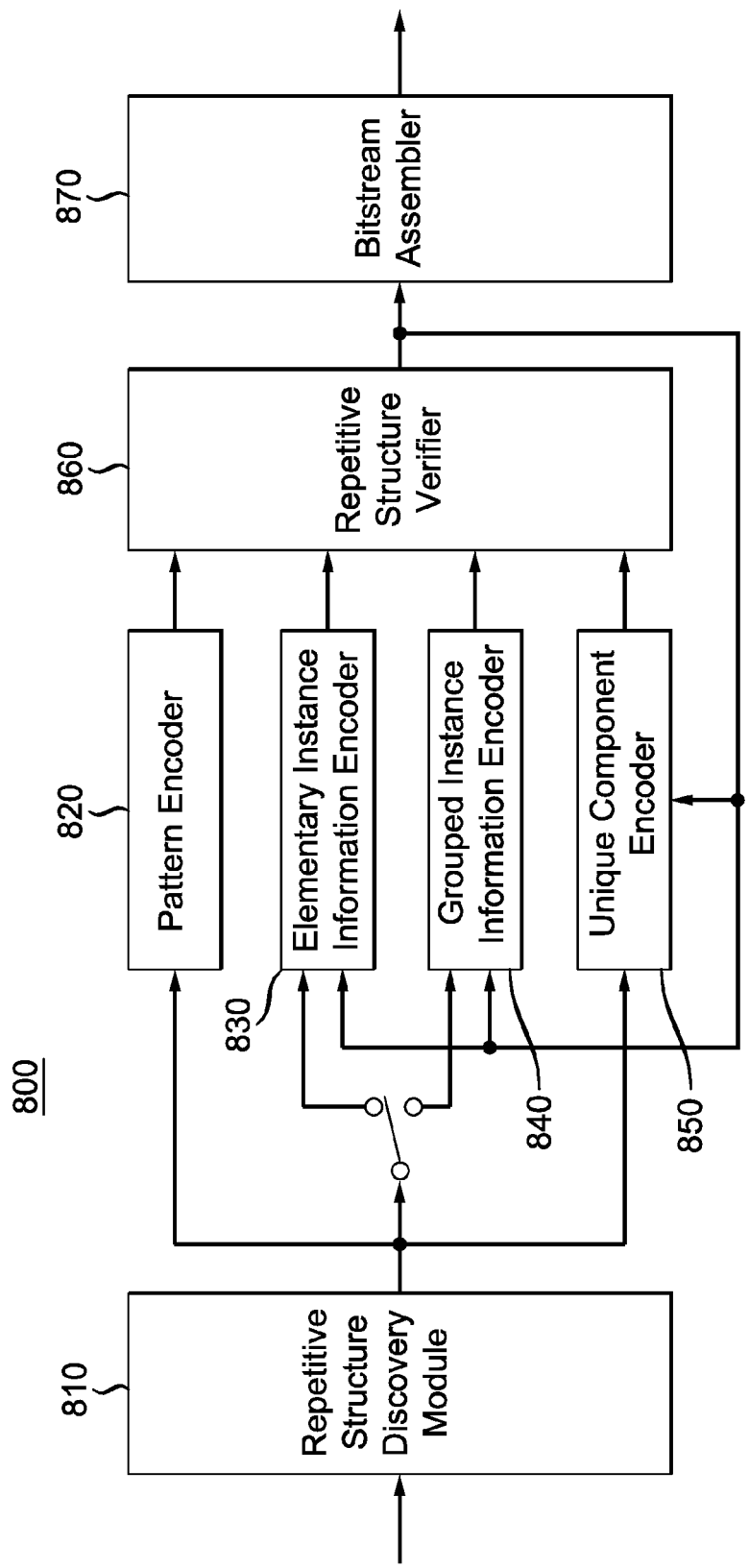
FIG. 8 shows an exemplary encoder of 3D models according to the present principles.

FIG. 8 depicts a block diagram of an exemplary 3D model encoder 800. The input of apparatus 800 may include a 3D model, quality parameter for encoding the 3D model and other metadata. The 3D model first goes through the repetitive structure discovery module 810, which outputs the 3D model in terms of patterns, instances and unique components. A pattern encoder 820 is employed to compress the patterns and a unique component encoder 850 is employed to encode the unique components. For the instances, the instance component information is encoded based on a user-selected mode. If instance information group mode is selected, the instance information is encoded using grouped instance information encoder 840; otherwise, it is encoded using an elementary instance information encoder 830. The instance encoder 600 may be used in encoder 830 or 840. The encoded components are further verified in the repetitive structure verifier 860. If an encoded component does not meet its quality requirement, it will be encoded using unique component encoder 850. Bitstreams for patterns, instances, and unique components are assembled at bitstream assembler 870.

Figure 9:
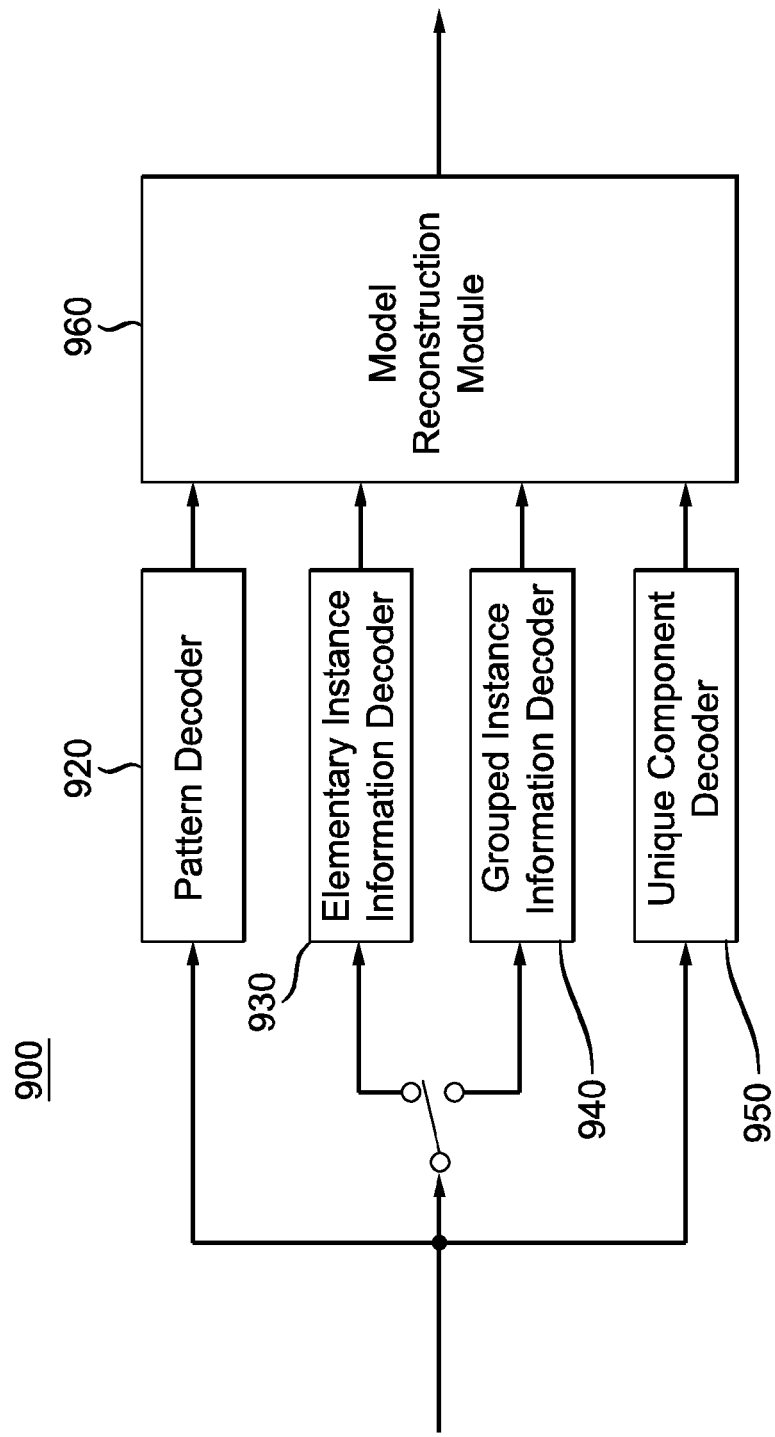
FIG. 9 shows an exemplary decoder of 3D models according to the present principles.

FIG. 9 depicts a block diagram of an exemplary 3D model decoder 900. The input of apparatus 900 may include a bitstream of a 3D model, for example, a bitstream generated by encoder 800. The information related to patterns in the compressed bitstream is decoded by pattern decoder 920. Information related to unique components is decoded by unique component decoder 950. The decoding of the instance information also depends on the user-selected mode. If instance information group mode is selected, the instance information is decoded using a grouped instance information decoder 940; otherwise, it is decoded using an elementary instance information decoder 930. The instance decoder 700 may be used in decoder 930 or 940. The decoded patterns, instance information and unique components are reconstructed to generate an output 3D model at model reconstruction module 960.

Figure 10:
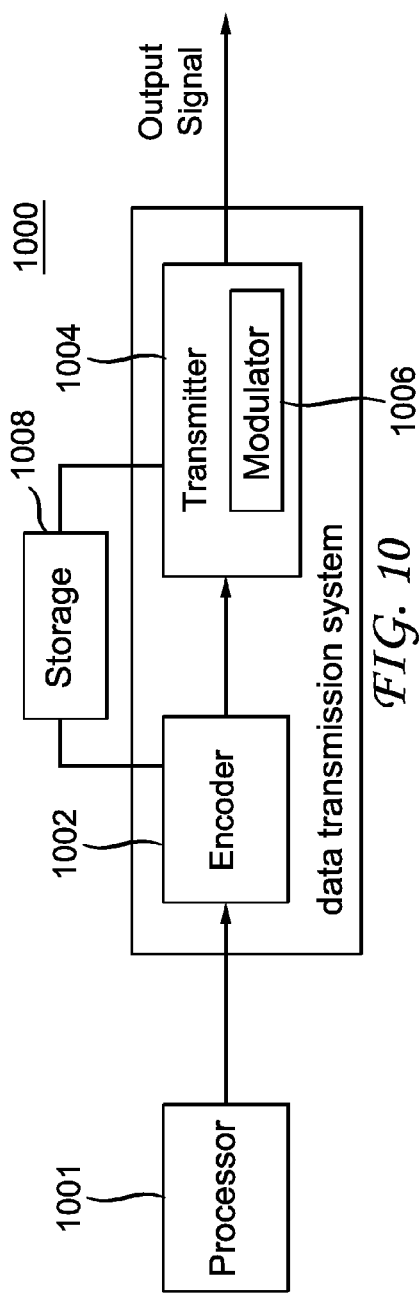
FIG. 10 is a block diagram depicting an example of a data processing system that may be used with one or more implementations of the present principles.

Referring to FIG. 10, a data transmission system 1000 is shown, to which the features and principles described above may be applied. The data transmission system 1000 may be, for example, a head-end or transmission system for transmitting a signal using any of a variety of media, such as, satellite, cable, telephone-line, or terrestrial broadcast. The data transmission system 1000 also may be used to provide a signal for storage. The transmission may be provided over the Internet or some other network. The data transmission system 1000 is capable of generating and delivering, for example, video content and other content such as 3D models.

The data transmission system 1000 receives processed data and other information from a processor 1001. In one implementation, the processor 1001 generates 3D models. The processor 1001 may also provide metadata to 1000 indicating, for example, which quality the 3D models should be encoded at.

The data transmission system or apparatus 1000 includes an encoder 1002 and a transmitter 1004 capable of transmitting the encoded signal. The encoder 1002 receives data information from the processor 1001. The encoder 1002 generates an encoded signal(s). The entropy encoding engine of encoder 1002 may be, for example, arithmetic coding or Huffman coding. Then encoder 1002 may be, for example, encoder 800 as described in FIG. 8.

The encoder 1202 may include sub-modules, including for example an assembly unit for receiving and assembling various pieces of information into a structured format for storage or transmission. The various pieces of information may include, for example, coded or uncoded video, and coded or uncoded elements. In some implementations, the encoder 1202 includes the processor 1201 and therefore performs the operations of the processor 1201.

The transmitter 1204 receives the encoded signal(s) from the encoder 1202 and transmits the encoded signal(s) in one or more output signals. The transmitter 1204 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1206. The transmitter 1204 may include, or interface with, an antenna (not shown). Further, implementations of the transmitter 1204 may be limited to the modulator 1206.

The data transmission system 1200 is also communicatively coupled to a storage unit 1208. In one implementation, the storage unit 1208 is coupled to the encoder 1202, and stores an encoded bitstream from the encoder 1202. In another implementation, the storage unit 1208 is coupled to the transmitter 1204, and stores a bitstream from the transmitter 1204. The bitstream from the transmitter 1204 may include, for example, one or more encoded bitstreams that have been further processed by the transmitter 1204. The storage unit 1208 is, in different implementations, one or more of a standard DVD, a Blu-Ray disc, a hard drive, or some other storage device.

Figure 11:
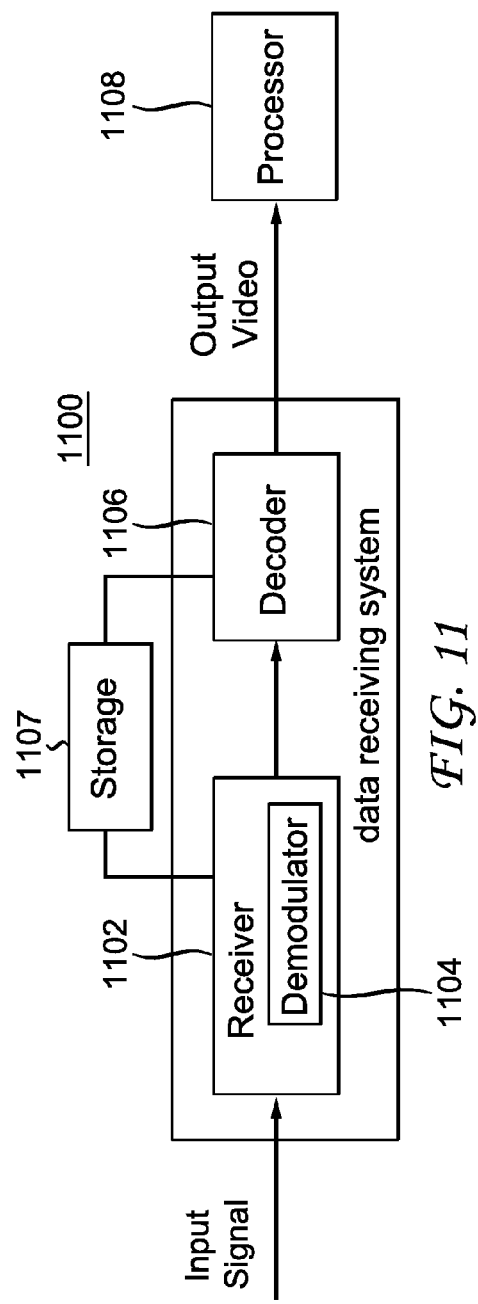
FIG. 11 is a block diagram depicting another example of a data processing system that may be used with one or more implementations of the present principles.

Referring to FIG. 11, a data receiving system 1100 is shown to which the features and principles described above may be applied. The data receiving system 1100 may be configured to receive signals over a variety of media, such as storage device, satellite, cable, telephone-line, or terrestrial broadcast. The signals may be received over the Internet or some other network.

The data receiving system 1100 may be, for example, a cell-phone, a computer, a set-top box, a television, or other device that receives encoded video and provides, for example, decoded video signal for display (display to a user, for example), for processing, or for storage. Thus, the data receiving system 1100 may provide its output to, for example, a screen of a television, a computer monitor, a computer (for storage, processing, or display), or some other storage, processing, or display device.

The data receiving system 1100 is capable of receiving and processing data information, and the data information may include, for example, 3D models. The data receiving system or apparatus 1100 includes a receiver 1102 for receiving an encoded signal, such as, for example, the signals described in the implementations of this application. The receiver 1102 may receive, for example, a signal providing one or more of the 3D models, or a signal output from the data transmission system 1000 of FIG. 10.

The receiver 1102 may be, for example, adapted to receive a program signal having a plurality of bitstreams representing encoded pictures or 3D models. Typical receivers perform functions such as, for example, one or more of receiving a modulated and encoded data signal, demodulating the data signal from one or more carriers using a demodulator 1104, de-randomizing the energy in the signal, de-interleaving the data in the signal, and error-correction decoding the signal. The receiver 1102 may include, or interface with, an antenna (not shown). Implementations of the receiver 1102 may be limited to the demodulator 1104.

The data receiving system 1100 includes a decoder 1106. The receiver 1102 provides a received signal to the decoder 1106. The signal provided to the decoder 1106 by the receiver 1102 may include one or more encoded bitstreams. The decoder 1106 outputs a decoded signal, such as, for example, decoded video signals including video information or 3D models. The decoder 1106 may be, for example, decoder 900 as described in FIG. 9.

The data receiving system or apparatus 1100 is also communicatively coupled to a storage unit 1107. In one implementation, the storage unit 1107 is coupled to the receiver 1102, and the receiver 1102 accesses a bitstream from the storage unit 1107. In another implementation, the storage unit 1107 is coupled to the decoder 1106, and the decoder 1106 accesses a bitstream from the storage unit 1107. The bitstream accessed from the storage unit 1107 includes, in different implementations, one or more encoded bitstreams. The storage unit 1107 is, in different implementations, one or more of a standard DVD, a Blu-Ray disc, a hard drive, or some other storage device.

The output data from the decoder 1106 is provided, in one implementation, to a processor 1108. The processor 1108 is, in one implementation, a processor configured for performing 3D model reconstruction. In some implementations, the decoder 1106 includes the processor 1108 and therefore performs the operations of the processor 1108. In other implementations, the processor 1108 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating or decoding a bitstream representing a 3D model, comprising:
  accessing a reconstructed instance corresponding to an instance associated with a pattern, the pattern representative of a plurality of repetitive structures in the 3D model, and the instance being one of the plurality of repetitive structures and represented as a transformation of the pattern;
  accessing a first quantization parameter used for quantizing a rotation part of the transformation, wherein the reconstructed instance is determined in response to the pattern and the first quantization parameter;

estimating an upper bound of a vertex coordinate error between a vertex of the instance and a corresponding vertex of the reconstructed instance, in response to at least one of (1) the first quantization parameter and (2) a distance between the corresponding vertex of the reconstructed instance and a rotation center of the reconstructed instance;

determining a second quantization parameter for quantizing the vertex coordinate error in response to the estimated upper bound; and performing encoding or decoding of the vertex coordinate error between the vertex of the instance and the corresponding vertex of the reconstructed instance based on the second quantization parameter.

2. The method of claim 1, further comprising:
determining whether the vertex coordinate error needs to be encoded or decoded in response to the at least one of (1) the first quantization parameter and (2) the distance between the corresponding vertex of the reconstructed instance and the rotation center of the reconstructed instance.

3. The method of claim 1, wherein the upper bound corresponds to $$\frac{\sqrt{2}\pi}{2^n}r,$$

wherein n corresponds to the first quantization parameter for the rotation part, and r is the distance between the corresponding vertex of the reconstructed instance and the rotation center of the reconstructed instance.

4. The method of claim 1, wherein the second quantization parameter is determined further in response to a maximum tolerable error.

5. The method of claim 4, wherein the maximum tolerable error is determined in response to a quantization error associated with quantizing a translation part of the transformation or quantizing geometry of the pattern.

6. The method of claim 5, wherein the quantization error associated with quantizing the translation part of the transformation is determined in response to a third quantization parameter for quantizing the translation part and a range for the translation part.

7. The method of claim 6, wherein the second quantization parameter is a function of $$Q_{translation} - \log_2 \frac{range}{e_{est}},$$

wherein $Q_{translation}$ is the third quantization parameter for quantizing the translation part, range is the maximum range for the translation part, and $e_{est}$ is the estimated upper bound.

8. The method of claim 1, further comprising:
determining the vertex coordinate error between the vertex of the instance and the corresponding vertex of the reconstructed instance;
quantizing the determined vertex coordinate error in response to the second quantization parameter to form a quantized error; and
encoding the quantized error into the bitstream.

9. The method of claim 1, further comprising:
determining the vertex coordinate error between the vertex of the instance and the corresponding vertex of the reconstructed instance from the bitstream;
de-quantizing the determined vertex coordinate error in response to the second quantization parameter to form a de-quantized error; and
refining the reconstructed instance in response to the de-quantized error.

10. An apparatus for generating or decoding a bitstream representing a 3D model, comprising at least a memory and one or more processors, the one or more processors being configured to:
access a reconstructed instance corresponding to an instance associated with a pattern, the pattern representative of a plurality of repetitive structures in the 3D model and the instance being one of the plurality of repetitive structures and represented as a transformation of the pattern, and the reconstruction being in response to the pattern and a first quantization parameter used for quantizing a rotation part of the transformation;
estimate an upper bound of a vertex coordinate error, between a vertex of the instance and a corresponding vertex of the reconstructed instance, along a particular axis in response to at least one of (1) the first quantization parameter and (2) a distance between the corresponding vertex of the reconstructed instance and the rotation center of the reconstructed instance;
determine a second quantization parameter for quantizing the vertex coordinate error along the particular axis, in response to the estimated upper bound for the vertex coordinate error along the particular axis; and
encode or decode the vertex coordinate error between the vertex of the instance and the corresponding vertex of the reconstructed instance based on the second quantization parameter.

11. The apparatus of claim 10, wherein the one or more processors are further configured to determine whether the vertex coordinate error needs to be encoded or decoded in response to the at least one of (1) the first quantization parameter and (2) the distance between the corresponding vertex of the reconstructed instance and the rotation center of the reconstructed instance.

12. The apparatus of claim 10, wherein the upper bound corresponds to $$\frac{\sqrt{2}\pi}{2^n}r,$$

wherein n corresponds to the first quantization parameter for the rotation part, and r is the distance between the corresponding vertex of the reconstructed instance and the rotation center of the reconstructed instance.

13. The apparatus of claim 10, wherein the one or more processors are configured to determine a maximum tolerable error in response to a quantization error associated with quantizing a translation part of the transformation or quantizing geometry of the pattern.

14. The apparatus of claim 13, wherein the one or more processors are configured to determine the quantization error associated with quantizing the translation part of the transformation in response to a third quantization parameter for quantizing the translation part and a range for the translation part.

15. The apparatus of claim 14, wherein the second quantization parameter is a function of $$Q_{translation} - \log_2 \frac{\text{range}}{e_{est}},$$

wherein $Q_{translation}$ is the third quantization parameter for quantizing the translation part, range is the maximum range for the translation part, and $e_{est}$ is the estimated upper bound.

16. The apparatus of claim 10, wherein the one or more processors are further configured to:
   determine the vertex coordinate error between the vertex of the instance and the corresponding vertex of the reconstructed instance; and
   encode the determined vertex coordinate error in response to the second quantization parameter.

17. The apparatus of claim 10, wherein the one or more processors are further configured to:
   determine the vertex coordinate error between the vertex of the instance and the corresponding vertex of the reconstructed instance from the bitstream;
   decode the determined vertex coordinate error in response to the second quantization parameter to form a de-quantized error; and
   refine the reconstructed instance in response to the de-quantized error.

* * * * *